(12) United States Patent
Yang et al.

(10) Patent No.: US 6,674,656 B1
(45) Date of Patent: Jan. 6, 2004

(54) PWM CONTROLLER HAVING A SAW-LIMITER FOR OUTPUT POWER LIMIT WITHOUT SENSING INPUT VOLTAGE

(75) Inventors: Ta-yung Yang, Taipei (TW); Jenn-yu G. Lin, Taipei (TW)

(73) Assignee: System General Corporation, Milpitas, CA (US)

( * ) Notice: Subject to any disclaimer, the term of this patent is extended or adjusted under 35 U.S.C. 154(b) by 0 days.

(21) Appl. No.: 10/065,532

(22) Filed: Oct. 28, 2002

(51) Int. Cl.$^7$ .............................................. H02M 3/335
(52) U.S. Cl. ...................... 363/21.1; 363/21.18; 363/41
(58) Field of Search .............................. 363/21.1, 21.11, 363/21.18, 41, 95, 97

(56) References Cited

U.S. PATENT DOCUMENTS

| | | | | |
|---|---|---|---|---|
| 4,764,856 A | * | 8/1988 | Rausch ..................... | 363/21.17 |
| 5,170,333 A | * | 12/1992 | Niwayama ................ | 363/21.11 |
| 5,189,599 A | * | 2/1993 | Messman .................. | 363/21.16 |
| 5,465,201 A | * | 11/1995 | Cohen ...................... | 363/21.09 |
| 5,583,752 A | * | 12/1996 | Sugimoto et al. ......... | 363/21.11 |
| 6,411,119 B1 | * | 6/2002 | Feldtkeller ................. | 324/771 |
| 6,583,994 B2 | * | 6/2003 | Clayton et al. ........... | 363/21.18 |

* cited by examiner

Primary Examiner—Bao Q. Vu
(74) Attorney, Agent, or Firm—Jianq Chyun IP Office

(57) ABSTRACT

A PWM controller having a saw-limiter for power limit without input voltage sensing. The saw-limiter has an adder, a reference voltage, a scaler and a saw-tooth signal that is generated by the PWM oscillator. The saw-limiter produces a saw-limited voltage. The PWM controller will turn off its output when the current-sense input signal of the PWM controller is higher than the saw-limited voltage. The saw-limited voltage is equal to the reference voltage while a PWM switching period starts. After that, the amplitude of the saw-limited voltage will gradually increase until it reaches its maximum voltage. Subsequently, a saw-tooth like waveform is generated for the saw-limited voltage. The slope of the current-sense input signal is proportional to the line voltage. Therefore, a higher line voltage creates a sharp slope for the current-sense input signal, which will be restricted by a lower saw-limited voltage and produces a shorter PWM signal. The PWM signal will be turned off once the voltage of the current sense input signal is higher than the saw limited voltage. In terms of power limit, using the saw-limiter the power limit will be lower when the line voltage is higher. By properly selecting the value of the scaler an identical output power limit for the low line and high line voltage input can be achieved.

3 Claims, 4 Drawing Sheets

PWM CONTROLLER HAVING A SAW-LIMITER FOR OUTPUT POWER LIMIT WITHOUT SENSING INPUT VOLTAGE

BACKGROUND OF INVENTION

1. Field of the Invention

The present invention relates to a power supply. More particularly, the present invention relates to a pulse width modulation (PWM) controller of a switching power supply.

2. Background of the Invention

The PWM is a conventional technology used in the switching power supply to control and regulate the output power. Various protection functions, such as over-voltage and over-current protections are built-in in the power supply to protect the power supply and circuits connected thereto from permanent damage. The function of output power limit is generally used for overload and short circuit protections. Referring to FIG. 1, a traditional PWM power supply circuit uses a PWM controller 100, such as PWM-control integrated circuit 3842, which has been widely used for power supplies. A resistor 230 that is connected serially with the power MOSFET 300 determines the maximum output power of the power supply. The method is to connect the voltage of the resistor 230 to the current-sense input (VS) of PWM controller 100. If the voltage on the VS is greater than the maximum current-sense voltage VM (e.g. 1V), PWM controller 100 will disable the output of its OUT pin, and it will also restrict the maximum power output. As the energy stored in an inductor is given by:

$$\epsilon = \tfrac{1}{2} \times L \times I^2 = P \times T$$

In the above equation, P is the maximum output power and can be expressed as:

$$I_p = \frac{V_{IN}}{L_p} \times t_{ON} \tag{1}$$

$$P = \frac{L_p}{2 \times T} \times I_p^2 = \frac{V_{IN}^2 \times t_{ON}^2}{2 \times L_p \times T} \tag{2}$$

In Equations (1) and (2), Ip and Lp are the primary current and the primary inductance of a transformer 400, $t_{ON}$ is the switch-on period of the PWM controller in which the power MOSFET 300 is switched on, T is the switching period of the PWM controller. From Equation (2), we find that the output power will vary as the input voltage $V_{IN}$ varies. When the safety regulations are taken into consideration, the range of the input voltage is AC 90V~264V, wherein the output power limit of the power supply in high line voltage is many times higher than the output power limit in low line voltage. Although the output voltage (power) will be kept constant by automatically adjusting $t_{ON}$ through a feedback loop, the maximum $t_{ON}$ is restricted when the VS≧VM (Ip×Rs≧VM, where Rs is the resistor 230). Furthermore, the maximum output power is also affected by the delay time $t_D$ of the PWM controller. From the moment that the voltage in VS pin is higher than the upper limit voltage (Ip×Rs≦1V) to the moment that PWM controller 100's OUT pin is actually turned off, there is a delay time $t_D$. Within this delay time $t_D$, the power MOSFET is still on, and it will continue delivering power. Therefore, the actual turn-on time of the PWM signal is equal to $t_{ON}+t_D$, and the actual output power becomes as follows:

$$P = \frac{V_{IN}^2 \times (t_{ON} + t_D)^2}{2 \times L_p \times T} \tag{3}$$

Although the tD time is short, generally within the range of 200 nsec~350 nsec, the higher the operating frequency is, the more impact is caused bytD. Because the switching period T is short, tD becomes relatively more important. The input voltage VIN should be compensated properly, such that the input voltage will not affect the maximum output power. Referring to FIG. 1, a bias resistor 220 is added between VIN and the VS pin for compensation. The function of bias resistor 220 can compensate the difference caused by the input voltage VIN and the delay time tD. By properly selecting the value of bias resistor 220, an identical output power limit for the low line and high line voltage input can result. The following analysis illustrates how to determine the bias resistor 220 reaching an identical output power limit.

With the incorporation of the bias resistor, the VS can be shown as $$V_S = \left(\frac{V_{IN}}{L_p} \times R_S \times t_{ON}\right) + (V_{IN} \times B_p). \tag{4}$$

Bp=R225/(R225+R220), R220 and R225 are the resistance of resistor 220 and 225.

The PWM controller 100 is turned off when VS=VM, take in $t_D$ and $t=t_{ON}+t_D$, the equation (4) can be expressed as $$V_M = \left[\frac{V_{IN}}{L_p} \times R_S \times (t - t_D)\right] + (V_{IN} \times B_p) \tag{5}$$

The expression of "$V_{IN} \times Bp = (V_{IN}/L_P) \times R_S \times t_D$" is set to achieve the identical output power limit. We finally get $$B_p = \frac{R_S}{L_p} \times t_D \tag{6}$$

However, the bias resistor 220 causes significant power consumption, especially in high line voltage input. The power consumption can be shown as:

$$P_R = \frac{V_{IN}^2}{R} \tag{7}$$

Besides, the high voltage existing in the resistor 220 causes inconvenience for the component selection and PCB layout.

SUMMARY OF INVENTION

The invention provides a PWM controller having a saw-limiter for power limit to achieve an identical output power limit for low line and high line voltage input. The saw-limiter comprises an adder, a reference voltage, a scaler and a saw-tooth signal that is generated by a PWM oscillator.

The input of the scaler is the saw-tooth signal, in which the saw-tooth signal is attenuated and maximum voltage of the saw-tooth signal is clamped. The adder sums the output of the scaler with the reference voltage, and produces a saw-limited voltage for the output power limit. The PWM controller will turn off its output when the current-sense input signal of the PWM controller is higher than the saw-limited voltage. The saw-limited voltage is equal to the reference voltage while a PWM switching period starts. After that, the amplitude of the saw-limited voltage will gradually increase until it reaches its maximum voltage. Subsequently, a saw-tooth like waveform is generated for the saw-limited voltage. The ramp of the current-sense input signal is proportional to the variation of the line voltage. If the line voltage is higher, the slope of the current-sense input signal will be steep and its related saw-limited voltage will be lower. In terms of power limit, using the saw-limiter, the power limit will be lower when the line voltage is higher. By properly selecting the value of the scaler in the saw-limiter an identical output power limit for the low line and high line voltage input can be achieved.

Advantageously, the PWM controller having a saw-limiter for output power limit of the present invention can provide compensation for a power supply's output power limit. Furthermore, no resistor is applied to sense the line voltage, which saves the power consumption, eases the PCB layout, and shrinks the size of power supply.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention together with the description, which serves to explain the principles of the invention.

DETAILED DESCRIPTION

Figure 1:
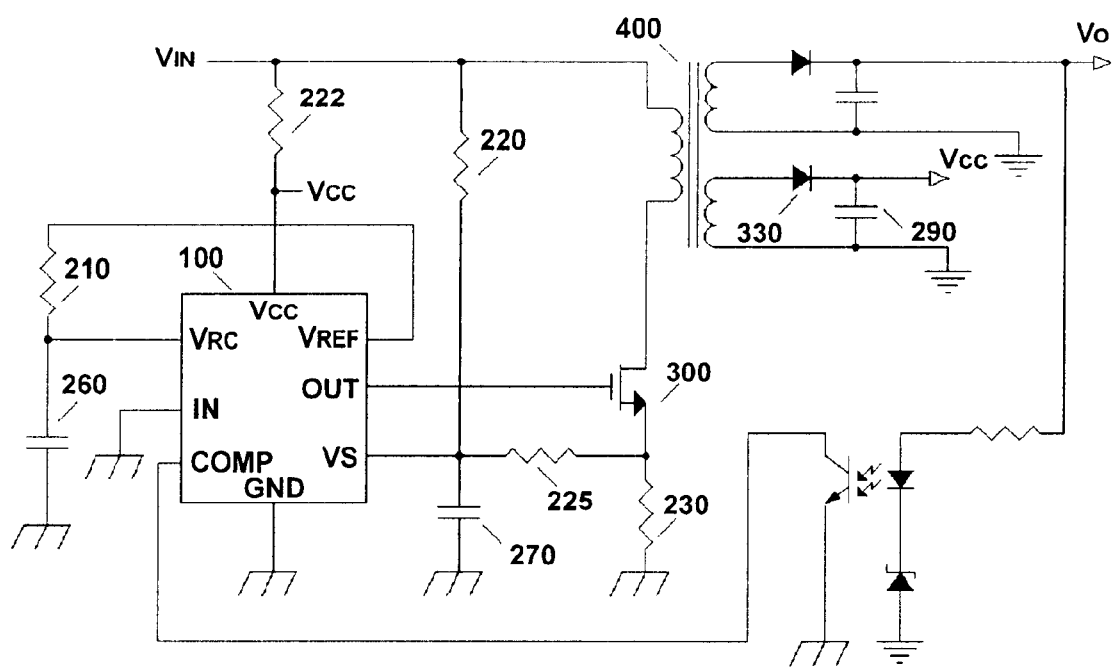
FIG. 1 illustrates a conventional application circuit for the PWM power supply.
Figure 2:
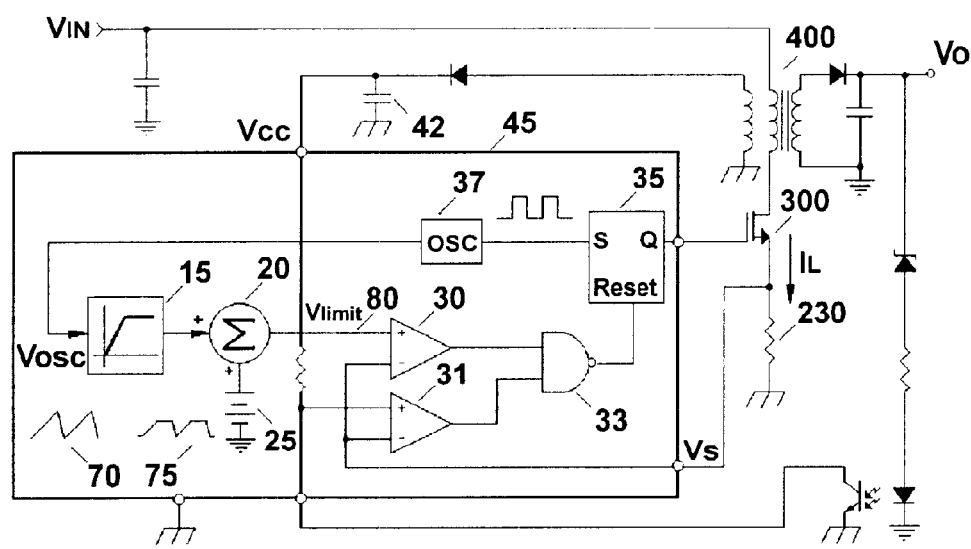
FIG. 2 shows the block diagram of the PWM controller including the present invention and connected circuits.

FIG. 2 shows the block diagram of a PWM controller 45 improved by the present invention.

The saw-limiter comprises an adder 20, a reference voltage 25, a scaler 15 and a saw-tooth signal 70 (Vosc) that is generated by a PWM oscillator 37. The input of the scaler 15 is the saw-tooth signal 70. Through the scaler 15, the saw-tooth signal is attenuated and maximum voltage of the saw-tooth signal is clamped. The saw-tooth signal 70 is shown as Vosc as:

$$V_{OSC} = \frac{V_A}{T} \times t_{ON}$$

Figure 3:
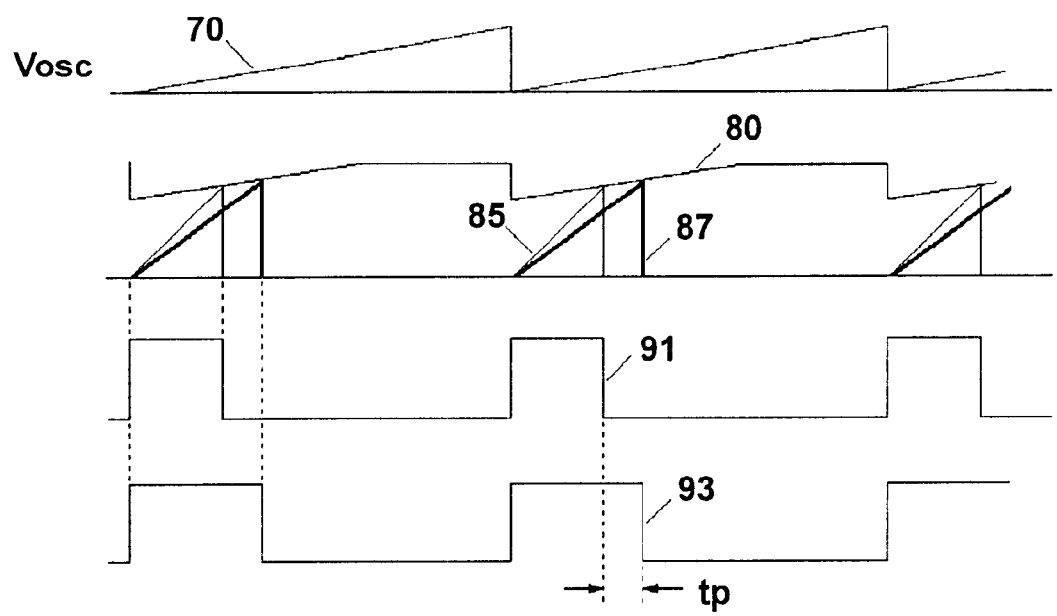
FIG. 3 displays the waveform of the present invention.

VA is the maximum amplitude of the saw-tooth signal. The adder 20 has two inputs, in which the output of the scaler 15 sums with the reference voltage 25 (VR), and produces a saw-limited voltage 80 (VLIMIT) for the output power limit. The PWM controller 45 will turn off its output when the current-sense input signal VS of the PWM controller 45 is higher than the saw-limited voltage 80. The saw-limited voltage 80 is equal to the reference voltage 25 when a PWM switching period starts. Then, the amplitude of the saw-limited voltage 80 will gradually increase until it reaches its maximum voltage. FIG. 3 displays the waveform of the present invention. The slope (SLVS) of the current-sense input signal VS is proportional to the line voltage. SLVS=(VIN/LP). The waveform 85 shows a current-sense input-signal VS that is produced by a high line voltage, in which a shorter PWM signal 91 is generated. The waveform 87 shows a current-sense input signal VS that is produced by a low line voltage, in which a PWM signal 93 with a broader pulse width is generated. Therefore, a higher line voltage. creates a sharp slope for the current-sense input signal VS which will be restricted by a lower saw-limited voltage 80 and produces a shorter PWM signal. The PWM signal will be turned off once the voltage of the current sense input signal VS is higher than the saw limited voltage 80. It can be expressed as $$V_R + \left(K \times \frac{V_A}{T} \times t_{ON}\right) = \left[\frac{V_{IN}}{L_p} \times R_S \times (t_{ON} + t_D)\right] \quad (8)$$

K is the attenuation value of the scaler 15.

$$V_R + \left(K \times \frac{V_A}{T} \times t_{ON1}\right) = \left[\frac{V_{IN1}}{L_p} \times R_S \times (t_{ON1} + t_D)\right] \quad (9)$$

$$V_R + \left(K \times \frac{V_A}{T} \times t_{ON2}\right) = \left[\frac{V_{IN2}}{L_p} \times R_S \times (t_{ON2} + t_D)\right] \quad (10)$$

In the equation (9) and (10), $V_{IN2}$ and $V_{IN1}$ represent a higher and a lower line voltage respectively. The $V_{IN2}$ produces a shorter on-time $t_{ON2}$ and the $V_{IN1}$ produces a broader on-time $t_{ON1}$, through the feedback loop control of the power supply given by $$\frac{V_{IN2}}{L_p} \times R_S \times t_{ON2} = \frac{V_{IN1}}{L_p} \times R_S \times t_{ON1} \quad (11)$$

By using equation (10) minus equation (9), $$\left[K \times \frac{V_A}{T} \times |(t_{ON2} - t_{ON1})|\right] = \left[\frac{(V_{IN2} - V_{IN1})}{L_p} \times R_S \times t_D\right] \quad (12)$$

$$K \times V_A = \left[\frac{(V_{IN2} - V_{IN1})}{L_p \times |(t_{ON2} - t_{ON1})|} \times R_S \times t_D \times T\right] \quad (13)$$

By properly selecting the K value of the scaler 15 an identical output power limit for the low line and high line voltage input can be achieved. For example, ($V_{IN2}-V_{IN1}$)= 250 V; ($t_{ON1}-t_{ON2}$)=3 usec; Lp=700 uH; T=15 usec; Rs=0.4 ohm; $t_D$=300 nsec.

According to equation 13, the K×VA is 0.214V.

In order to limit the output power and protect the power supply in the low line voltage conditions, such as brownout condition, the scaler 15 will clamp the voltage of the saw-limited voltage 80 under the maximum value.

Figure 4:
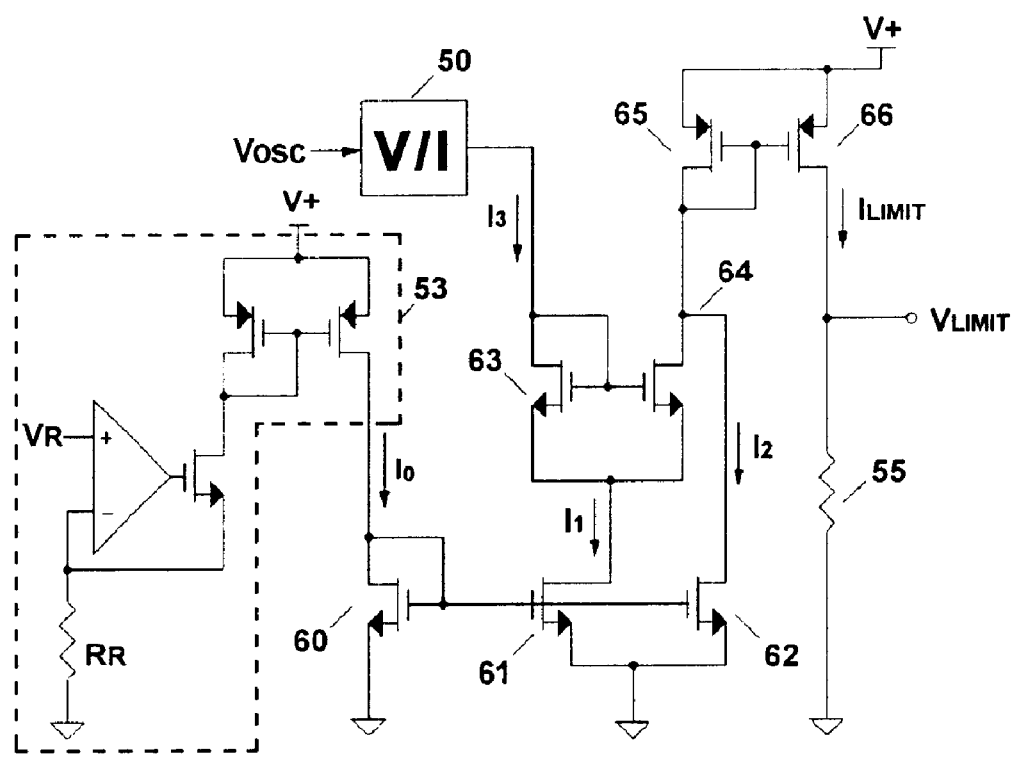
FIG. 4 is the circuit schematic of the present invention inside the integrated circuits.

FIG. 4 is the schematic circuit of the saw-limiter of present invention inside the integrated circuits. Through a V-to-I converter 50 the saw-tooth signal Vosc is converted to a current I3, that is $$I_3 = \frac{V_{OSC}}{R_A}$$

RA is the resistance of a V-to-I converter 50. The reference voltage 25 (VR) in FIG. 2 generates a current I0 through V-to-I converter 53. A transistor 60, a transistor 61 and a transistor 62 are cross-coupled to form a reference-current mirror. The source of the transistor 60, 61 and 62 are connected to the ground. The gate of the transistor 60, 61 and 62 are connected together. The drain of the transistor 60 is connected to its gate. The I0, the output current of the V-to-I converter 53 flows into the drain of the transistor 60 and produces a current I1 and a current I2 in the drain of the transistor 61 and the drain of the transistor 62 respectively, such as $$I_0 = \frac{V_R}{R_R}; \quad I_1 = N_1 \times I_0; \quad I_2 = N_2 \times I_0;$$

A transistor 63 and a transistor 64 are cross-coupled to form an input-current mirror. The gate of transistor 63 and 64 are connected together. The drain of the transistor 63 is connected to its gate. I3, the output current of the V-to-I converter 50, flows into the drain of the transistor 63 and produces an output current in the drain of the transistor 64. The sources of transistor 63 and 64 are connected together, and connected to the drain of the transistor 61. Thereby the current of the input-current mirror is limited by the current I1. A transistor 65 and a transistor 66 are cross-coupled to form an output-current mirror. The source of the transistor 65 and 66 are connected to a supply voltage. The gate of the transistor 65 and 66 are connected together. The drain of the transistor 65 is connected to its gate. The current I2 and the output current of the input-current mirror flow into the drain of the transistor 65 and produces a current ILIMIT in the drain of the transistor 66. The current ILIMIT flows through a resistor 55 and produces the saw-limited voltage VLIMIT as Equation (14) shows.

$$V_{LIMIT} = I_{LIMIT} \times R_{55} \tag{14}$$

The input of the input-current mirror is the current I3 and the output of the input-current mirror is the current of (N3×I3). The input of the output-current mirror is the sum of the current I2 and (N3×I3). The current I2 is used for generating the reference voltage 25. Because the current of the input-current mirror is limited by the current I1, the maximum current of the (N3×I3) is clamped under the amplitude of the I1.

$$I_{LIMIT} = I_2 + N_3 \times I_3; \text{ where } (N_3 \times I_3) < I_1; \tag{15}$$

From Equation (14) and (15), we can get $$V_{LIMIT} = \left[\left(N_2 \times \frac{V_R}{R_R}\right) + \left(N_3 \times \frac{V_{OSC}}{R_A}\right)\right] \times R_{55} \tag{16}$$

Set $$\left(N_2 \times \frac{R_{55}}{R_R}\right) = 1;$$

Then, the K value of the scaler 15 can be expressed as $$K = N_3 \times \frac{R_{55}}{R_A} \tag{17}$$

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A PWM controller having a saw-limiter for the output power limit, comprising:

an oscillator, operative to generate a saw-tooth signal;

a reference voltage source, operative to provide a reference voltage;

a scaler, operative to attenuate said saw-tooth signal and clamping said saw-tooth signal under a maximum voltage; and an adder having two inputs and one output, to sum an output of said scaler with said reference voltage and produce a saw-limited voltage for the output power limit, wherein said saw-limited voltage is equal to said reference voltage while a PWM switching period starts, and then gradually rises to said maximum voltage and said attenuation of said scaler determines a slope of an increment of said saw-limited voltage.

2. A PWM controller having a saw-limiter as claimed in claim 1 comprising:

a V-to-I converter, which converts said saw-tooth signal to a saw-tooth current;

a current source generating a constant current;

a first transistor having a source connected to the ground, and a gate connected to a drain, in which the constant current flows into the drain;

a second transistor having a source connected to the ground, a gate connected to the gate of the first transistor, and a drain to output a maximum current;

a third transistor having a source connected to the ground, a gate connected to the gate of the first transistor, and a drain to output a reference current;

wherein the first transistor, the second transistor and the third transistor are cross-coupled to form a reference-current mirror, a fourth transistor having a source connected to the drain of the second transistor, and a gate connected to a drain, in which the saw-tooth current flows into the drain;

a fifth transistor having a source connected to the drain of the second transistor, a gate connected to the gate of the fourth transistor, and a drain to output a scaled current; wherein the fourth transistor and the fifth transistor are cross-coupled to form an input-current mirror;

a sixth transistor having a source connected to the supply voltage, and a gate connected to a drain, in which the reference current and the scaled current flow into the drain;

a seventh transistor having a source connected to the supply voltage, a gate connected to the gate of the sixth transistor, and a drain to output a saw-limited current; wherein the sixth transistor and the seventh transistor are cross-coupled to form an output-current mirror;

a first resistor having a terminal connected to the ground and another terminal connected to the drain of the seventh transistor, in which the saw-limited current flows through the first resistor to produce the saw-limited voltage;

wherein the maximum current limits the saw-limited voltage under the maximum voltage, the reference current generates the reference voltage in the first resistor while the PWM switching period starts, and then by the rise of the scaled current the saw-limited voltage gradually rises to said maximum voltage, and a transfer rate of the input-current mirror and a transfer rate of the output-current mirror determine a slope of an increment of said saw-limited voltage.

3. A PWM controller having a saw-limiter as claimed in claim 2, wherein said current source comprising:
- an operation amplifier having a positive input connected to a constant voltage, a negative input and an output;
- a second resistor having a terminal connected to the ground and another terminal connected to the negative input of the operation amplifier;
- a V-to-I transistor having a gate is driven by the output of the operation amplifier, a source connected to the negative input of the operation amplifier to develop a source-follow current, and a drain to output the source-follow current;
- a left transistor having a source connected to the supply voltage, and a gate connected to a drain, in which the drain of the left transistor is connected to the drain of the V-to-I transistor;
- a right transistor having a source connected to the supply voltage, a gate connected to the gate of the left transistor, and a drain; in which the left transistor and the right transistor are across-coupled to form a constant-current mirror, and the drain of the right transistor outputs the constant current.

* * * * *